Nov. 20, 1923

G. F. DU BUQUE

BREAD SLICER

Filed March 19, 1923

Inventor:
George F. Du Buque.
By Martin P. Smith, Atty.

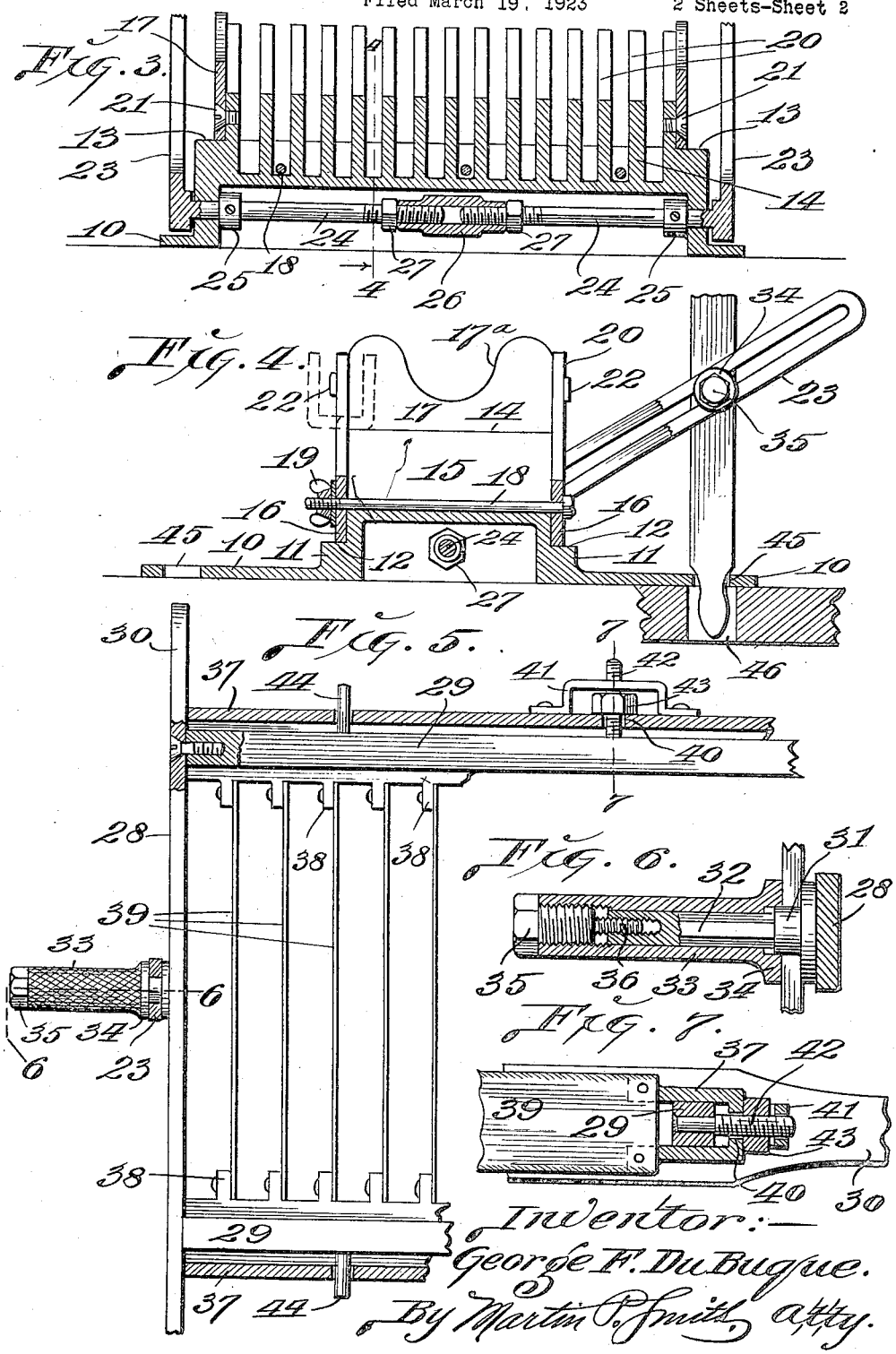

Patented Nov. 20, 1923.

1,474,767

UNITED STATES PATENT OFFICE.

GEORGE F. DU BUQUE, OF LOS ANGELES, CALIFORNIA.

BREAD SLICER.

Application filed March 19, 1923. Serial No. 626,057.

*To all whom it may concern:*

Be it known that I, GEORGE F. DU BUQUE, a citizen of the United States, residing at Los Angeles, in the county of Los Angeles, State of California, have invented new and useful Improvements in Bread Slicers, of which the following is a specification.

My invention relates to a bread slicing mechanism of the general type disclosed in U. S. Letters Patent No. 1,442,762 issued to me January 16, 1923; the principal objects of my present invention being to generally improve upon and simplify the construction of the slicing mechanism set forth in my aforesaid patent, as well as other similar types of bread cutting or slicing machines and to provide a relatively simple, practical and easily manipulated machine that may be effectively used for simultaneously cutting or slicing a loaf of bread or the like into a plurality of sections of uniform thickness.

Further objects of my invention are, to provide a relatively simple and convenient crate or holder for the loaf of bread that is sliced in the machine, to provide improved means of mounting the blade carrying frame, whereby the same may be swung freely from one side of the machine to the other or rocked while the slicing operation is being performed and, further to provide simple and efficient means for simultaneously imparting tension to the cutting blades.

With the foregoing and other objects in view, my invention consists in certain novel features of construction and arrangement of parts that will hereinafter be more fully described and claimed and illustrated in the accompanying drawings in which:

Fig. 3 is a vertical section taken lengthwise through the center of the machine.

Fig. 4 is a cross section taken on the line 4—4 of Fig. 3.

Fig. 5 is a plan view of a portion of the blade carrying frame with parts thereof in section.

Fig. 6 is an enlarged sectional view taken on the line 6—6 of Fig. 5.

Fig. 7 is an enlarged detail section taken on the line 7—7 of Fig. 5.

Figure 1:
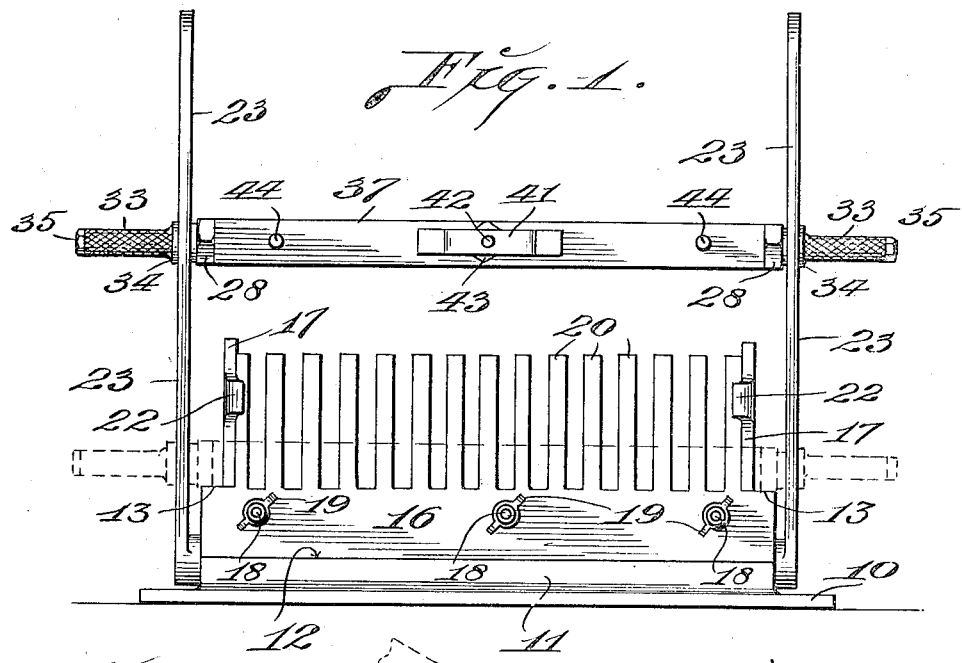
Fig. 1 is a side elevational view of a slicing machine of my improved construction.

Referring by numerals to the accompanying drawings, 10 designates a flat plate that is adapted to rest on a table or like support and projecting upwardly from the central portion of said plate is a substantially rectangular hollow base 11.

Shoulders 12 are formed on the side faces of the base 11 and formed on the ends of said base are shoulders 13.

Formed on top of the base is a series of transversely disposed parallel ribs 14 and the slots 15 between said ribs serve to accommodate the blades of the cutting frame, after said blades have passed through the loaf of bread that rests on the tops of the ribs.

The crate or receptacle for the loaf that is being sliced includes a pair of side walls 16 and a pair of end walls 17.

The side walls 16 are positioned against the side faces of the base 2 with the lower edges of said walls resting upon the shoulders 12 and said walls are securely held on the base by bolts 18 that pass through said walls and through the lower portions of certain of the slots 15.

The threaded ends of these bolts receive winged nuts 19.

Projecting upwardly from the side plates 16 are fingers 20 that co-incide with and lie directly against the ends of the ribs 14 and said fingers project a substantial distance above the plane occupied by the tops of the ribs.

The lower edges of the end walls 17 rest directly upon the shoulders 13 on the end of base 11 and said end walls are secured in any suitable manner to the ends of base 11, preferably by screws or bolts, such as 21.

Lips 22 are formed on the end of the walls 17 and engage the ends of side walls 16, thereby assisting bolts 18 and 21 in holding the walls of the crate firmly in assembled relation.

Thus the loaf receiving and holding crate includes the tops of the ribs 14, the upper portions of the fingers 20, and the end walls 17.

The upper central portions of the end walls 17, are cut away as designated by 17a in order to permit the ends of the sliced loaf to be readily engaged when removed from the crate.

The swinging support for the slicing frame includes a pair of slotted arms 23 that are arranged at the ends of the combined base and crate and projecting inwardly through the end walls of the base 11 are rods 24 that are arranged for rocking movement in said end walls.

Collars 25 are secured by means of set screws upon the rods 24 just inside the end walls of the base.

The inner ends of the rods 24 are threaded to receive a turnbuckle 26 and lock nuts 27 are arranged on said rods at the ends of said turnbuckle.

Supported for sliding movement upon the slotted arms 23 is a reversible cutting or slicing frame that includes a pair of end rails 28 and a pair of side rails 29.

The end portions of the end rails 28 project beyond the ends of the side rails to form handles 30 that may be manually engaged during the manipulation of the slicing frame.

Projecting outwardly from the central portions of the end rails are bearing studs 31 that are adapted to slide and rock in the slots of arms 23 and projecting outwardly from each lug 31 is a stem 32, that is square or hexagonal in cross section.

Removably positioned on each stem 32 is a thimble 33, having at its inner end a flange 34 that bears the outer face of the slotted arm and screw seated in the outer end of said thimble is the threaded shank of a bolt 35 having a head on its outer end and a small threaded shank 36 on its inner end, said last mentioned shank being screw seated in the outer end portion of stem 32. (See Fig. 6.)

The outer surface of thimble 33 is knurled, in order that it may be readily grasped when the cutting frame is manipulated, and the bolt 35 provides means for securely holding the thimble in adjusted position upon the non-circular stem 32.

Loosely arranged on each side bar 29 is a channel shaped member 37 and formed on the inner edges of the flanges thereof are lugs 38, to which are secured, preferably by means of rivets, the ends of thin, double-edged blades 39.

Obviously, the blades 39 may be detachably connected to the lugs 38, and such construction is desirable in that it permits the blades to be individually detached and removed should the same become worn, broken or unfit for service.

Seated in the central portions of the bars 29 and projecting outwardly through apertures 40 in the channels 37 and through corresponding apertures that are formed in straps 41 that are secured to said channels are threaded pins 42.

Seated on these pins between the channels and straps are nuts 43, which when manipulated move the channels inwardly or outwardly upon the bars 29 and adjust the tension of the blades 39. (See Fig. 7.)

Guide pins 44 are seated in the end portions of bars 29 and pass through suitably located apertures in the channels 37.

Formed in base plate 10, to the sides of the loaf receiving crate are apertures 45 that coincide with apertures 46 that are formed in the table on which the slicer is positioned.

Figure 2:
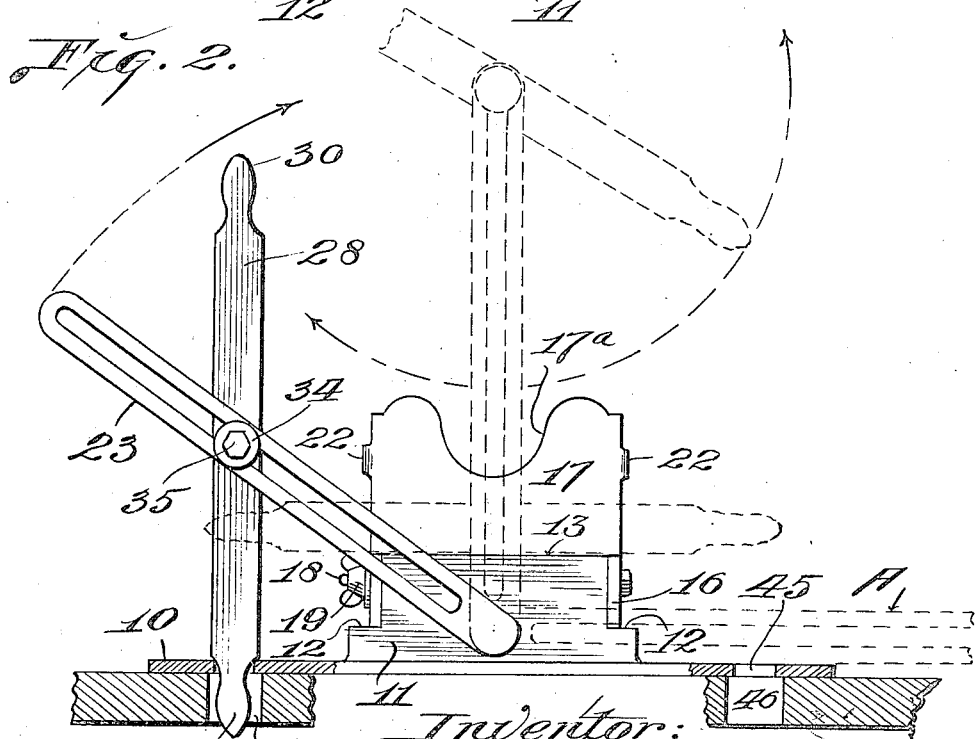
Fig. 2 is an end elevational view of the machine.

While the slicer is not in use, the cutting frame may occupy a substantially vertical position on either side of the crate with the handles on the lower ends of rails 28, positioned in the apertures as illustrated in Figs. 2 and 4, or the slotted arms 23 and cutting frame may be laid flat upon the base 10 to the side of the crate as shown by dotted lines A Fig. 2.

To use the slicer, the cutting frame is manually engaged and swung into position directly above the crate and the loaf positioned therein, after which the cutting frame is moved downwardly to force the blades through the loaf.

To facilitate the slicing operation, the frame may be reciprocated and rocked as it cuts through the loaf and thus when the frame has been moved downward until the rails 28 rest on the shoulders 13, the cutting blades have passed entirely through the loaf and occupy positions wholly within the slots 15.

Thus the loaf is simultaneously cut or sliced into a plurality of sections of equal thickness.

The cutting frame is mounted so that it may be easily and quickly swung into and out of cutting position, or reversed so as to bring either set of cutting edges into active or cutting position.

A slicing machine of my improved construction may be easily and cheaply produced and possesses superior advantages in point of simplicity, durability and general efficiency.

Obviously minor changes in the size, form and construction of the various parts of my improved bread slicing machine may be made and substituted for those herein described without departing from the spirit of the invention, the scope of which is set forth in the appended claims.

While the slicer is not in use, the cutting frame may occupy a substantially vertical position on either side of the crate with the handles on the lower ends of rails 28, positioned in the apertures as illustrated in Figs. 2 and 4 or the slotted arms 23 and cutting frame may be laid flat upon the base 10 to the side of the crate as shown by dotted lines A, Fig. 2.

To use the slicer, the cutting frame is manually engaged and swung into position directly above the crate and the loaf positioned therein, after which the cutting frame is moved downwardly to force the blades through the loaf.

To facilitate the slicing operation, the frame may be reciprocated and rocked as it cuts through the loaf and thus when the frame has been moved downward until the rails 28 rest on the shoulders 13, the cutting blades have passed entirely through the loaf and occupy positions wholly within the slots 15.

Thus the loaf is simultaneously cut or sliced into a plurality of sections of equal thickness.

The cutting frame is mounted so that it may be easily and quickly swung into and out of cutting position, or reversed so as to bring either set of cutting edges into active or cutting position.

In order to accommodate loaves of different widths, side plates having their upper portions offset as illustrated by dotted lines in Fig. 4 may be used and by shifting said plates from one side of the crate to the other, the offset portions may be inwardly or outwardly presented as desired.

A slicing machine of my improved construction may be easily and cheaply produced and possesses superior advantages in point of simplicity, durability and general efficiency.

Obviously minor changes in the size, form and construction of the various parts of my improved bread slicing machine may be made and substituted for those herein described without departing from the spirit of the invention, the scope of which is set forth in the appended claims.

I claim—

1. In a slicing mechanism, a base, a loaf holding crate on said base, arms connected to the ends of said base for swinging movement, a blade-carrying frame arranged for sliding and rotary movement on said arms and said base being provided with apertures that are adapted to receive and hold parts of said frame while the same is not in use.

2. In a slicing mechanism, a base, a loaf-holding crate on said base, a rock shaft journaled in said base, arms secured to said rock shaft at the ends of said base and a blade-carrying frame mounted for sliding and rotary movement upon said arms.

3. In a slicing mechanism, a base, a loaf-holding crate on said base, a blade-carrying frame mounted for swinging and rotary movement above said crate, said frame having handles at its corners and the base being provided with apertures that receive and hold said handles while the frame is not in use.

4. In a slicing mechanism, a base, a loaf-holding crate being provided with transversely disposed slots, slotted arms journaled on the ends of said base, a blade-carrying frame arranged for sliding and rotary movement on said arms and the blades of said frame being transversely arranged and adapted to enter the slots in said crate when said frame is moved downwardly onto the base.

5. In a slicing mechanism, a cutting frame comprising a pair of end rails and a pair of side rails, channel bars adjustably mounted on said side rails, and double-edged blades secured to said channel bars.

6. In a slicing mechanism, a base, a loaf-receiving crate on said base, arms arranged for swinging movement at the ends of said base, a blade-carrying frame and handles projecting from the ends of said frame and arranged for sliding and rotary movement on said arms.

7. In a slicing mechanism, a base, a loaf-receiving crate on said base, arms arranged for swinging movement at the ends of said base, a blade-carrying frame, handles projecting from the ends of said frame and arranged for sliding and rotary movement on said arms and handles at the corners of said blade-carrying frame.

8. In a slicing mechanism, a base, a loaf-receiving crate on said base, arms mounted for swinging movement at the ends of said base, a reversible frame mounted for sliding movement upon said arms and a series of double-edged blades carried by said frame.

9. In a slicing mechanism, a base, a loaf-receiving crate on said base, arms mounted for swinging movement at the ends of said base, a reversible frame mounted for sliding movement upon said arms, a series of double-edged blades carried by said frame and means for limiting the movement of the frame into said crate.

10. In a slicing mechanism, the combination with a loaf-receiving crate comprising a slotted base, end walls and slotted side walls, of arms mounted for swinging movement on said crate and a reversible blade-carrying frame arranged for sliding and rotary movement upon said arms.

In testimony whereof I have signed my name to this specification.

GEORGE F. DU BUQUE.